United States Patent
de Oliveira et al.

(10) Patent No.: US 11,618,690 B2
(45) Date of Patent: Apr. 4, 2023

(54) CONDUCTIVE MATERIALS MADE OF Nb-DOPED TIO₂ PARTICLES

(71) Applicant: Leibniz-Institut für Neue Materialien gemeinnützige GmbH, Saarbrücken (DE)

(72) Inventors: Peter William de Oliveira, Saarbrücken (DE); Jana Staudt, Saarbrücken (DE)

(73) Assignee: Leibniz-Institut für Neue Materialien gemeinnützige GmbH, Saarbrücken (DE)

( * ) Notice: Subject to any disclaimer, the term of this patent is extended or adjusted under 35 U.S.C. 154(b) by 242 days.

(21) Appl. No.: 16/772,230

(22) PCT Filed: Dec. 3, 2018

(86) PCT No.: PCT/EP2018/083323
§ 371 (c)(1),
(2) Date: Jun. 12, 2020

(87) PCT Pub. No.: WO2019/129463
PCT Pub. Date: Jul. 4, 2019

(65) Prior Publication Data
US 2021/0078872 A1    Mar. 18, 2021

(30) Foreign Application Priority Data
Dec. 27, 2017 (DE) .................. 10 2017 131 349.4

(51) Int. Cl.
*C01G 23/053* (2006.01)
*C01G 33/00* (2006.01)
(Continued)

(52) U.S. Cl.
CPC .......... *C01G 23/053* (2013.01); *C01G 33/00* (2013.01); *B82Y 30/00* (2013.01); *B82Y 40/00* (2013.01);
(Continued)

(58) Field of Classification Search
None
See application file for complete search history.

(56) References Cited

U.S. PATENT DOCUMENTS 4,483,785 A    11/1984    Johnson et al.
2016/0087275 A1*    3/2016    Zhang .................. H01M 4/485
429/7

FOREIGN PATENT DOCUMENTS

CN    106191775 A    12/2016
JP    2015196634 A *    11/2015
(Continued)

OTHER PUBLICATIONS

Wu et al., Improving the electrical properties of niobium-doped titania sputtering targets by sintering in oxygen-deficient atmospheres, Mar. 2015, Ceramics International, 41, 8856-8860 (Year: 2015).*

(Continued)

*Primary Examiner* — Daniel S Gatewood
(74) *Attorney, Agent, or Firm* — Cahn & Samuels, LLP

(57) ABSTRACT

A method for producing conductive materials from Nb-doped TiO2-particles, in which Nb-doped TiO2-particles are pressed to form bodies and the bodies are treated in an oxygen-containing atmosphere and at a reducing atmosphere.

15 Claims, 7 Drawing Sheets

(51) Int. Cl.
  *B82Y 30/00* (2011.01)
  *B82Y 40/00* (2011.01)
(52) U.S. Cl.
  CPC ...... *C01P 2002/01* (2013.01); *C01P 2002/54* (2013.01); *C01P 2002/72* (2013.01); *C01P 2004/64* (2013.01); *C01P 2006/40* (2013.01)

(56) References Cited

FOREIGN PATENT DOCUMENTS

JP  2015196634 A  11/2015
WO  2017190277 A1  9/2017

OTHER PUBLICATIONS

Liu, Y. et al., "Niobium-Doped Titania Nanoparticles: Synthesis and Assembly into Mesoporous Films and Electrical Conductivity," ACS Nano, 2010, 4(9), 5373-5381.

Nemec, H. et al., "Tuning the Mechanism in Niobium-Doped Titania Nanoparticle Networks," J. Phys. Chem., 115, 2011, 6968-6974.

Wu, M. et al., "Improving the Electrical Properties of Niobium-Doped Titania Sputtering Targets by Sintering in Oxygen-Deficient Atmospheres," Ceramics International, 41(7), 2015, 8856-8860.

Nguyen, S. et al., "Ethanol Electro-Oxidation Activity of Nb-doped-TiO2 Supported PdAg Catalysts in Alkaline Media," Applied Catalysis B: Environmental, 113-114, 2011, 261-270.

International Search Report, Application No. PCT/EP2018/083323, dated Feb. 2019.

International Written Opinion Report, Application No. PCT/EP2018/083323, dated Dec. 2017.

English Abstract for CN106191775 A, printed on Jun. 2020.

English Abstract for JP2015196634 A, printed on Jun. 2020.

Vogelsang, K., Sythese und Characterisierung undottier und dotierte Titandioxid-Photokatalysatoren sowie Untersuchungen zur Diffusion von Wasserstoff und Stickstoff in Eisen und Eisenitriden.

English Abstract for WO 2017190277, printed on Jun. 2020.

WIPO International Preliminary Report on Patentability, Application No. PCT/EP2018/083323, dated Jul. 2020.

\* cited by examiner

CONDUCTIVE MATERIALS MADE OF NB-DOPED TIO$_2$ PARTICLES

This patent application is a U.S. national stage application of PCT international application PCT/EP2018/083323 filed on 3 Dec. 2018 and claims priority of German patent document 10 2017 131 349.4 filed on 27 Dec. 2017, the entireties of which are incorporated herein by reference.

DESCRIPTION

Field of the Invention

The invention relates to a process for preparing conductive materials made from Nb-doped TiO$_2$ particles, and to conductive bodies produced therewith.

Background of the Invention

Nb-doped TiO$_2$ (TNO) is mentioned in the literature as a substitute for indium tin oxide (ITO) for transparent conductive layers. This statement is based on the fact that sputtered layers of the material shows similar optical and electrical properties to sputtered ITO layers. There are isolated attempts to use the material by wet-chemical techniques as well, for example in the production of a sol from precursors and spin- or dip-coating. This achieves worse conductivities at least by a factor of 1000 than sputtered applications. There are various known syntheses of Nb-doped TiO$_2$ nanoparticles, but usually different precursors, solvents or additives (e.g. acids) are used. Two scientific publications describe the production of Nb-doped nanoparticles and the compressing of these particles to pellets. After an aftertreatment under nitrogen at 600° C., this achieved a resistivity of these pellets of up to 4 Ωcm (Liu et al., ACS Nano 4, 9 (2010) 5373-5381; Nemec et al., J. Phys. Chem. C, 115 (2011) 6968-6974).

It is an object of the invention to specify a process that enables the production of conductive bodies from Nb-doped titanium dioxide, and bodies and particles produced therewith for production of these bodies.

SUMMARY OF THE INVENTION

This object is achieved by the inventions having the features of the independent claims. Advantageous developments of the inventions are identified in the dependent claims. The wording of all claims is hereby incorporated by reference into this description. The inventions also include all viable combinations, and especially all combinations mentioned, of independent and/or dependent claims.

The object is achieved by a process for producing conductive bodies from Nb-doped TiO$_2$ particles, comprising the following steps:
a) compressing particles comprising Nb-doped TiO$_2$ to give a body;
b) subjecting the body to heat treatment in an oxygenous atmosphere;
c) subjecting the body to heat treatment in a reducing atmosphere.

There follows a detailed description of individual process steps. The steps need not necessarily be conducted in the sequence specified, and the process to be outlined may also include further unspecified steps.

In a first step, Nb-doped TiO$_2$ particles are compressed to give a body.

In a preferred embodiment of the invention, the particles are nanoparticles. These are understood to mean particles having a particle size below 200 nm. This means that, in a sample of at least 100 particles, none of the particles has a greater diameter (measured by TEM). Preference is given to a particle size of not more than 100 nm, especially not more than 50 nm, especially from 1 to 200 nm, preferably from 2 to 100 nm, more preferably from 2 to 50 nm. Particular preference is given to particles having a particle size of 2 to 30 nm, and 2 to 20 nm.

The TiO$_2$ particles are Nb-doped TiO$_2$ particles. Preference is given to particles having an Nb content of up to 30 at % based on the sum total of Nb and Ti atoms, preferably of up to 20 at %. The Nb content is preferably at least 2 at %, preferably at least 5 at %.

The particles can normally be produced in various ways, for example by flame pyrolysis, plasma methods, colloid techniques, sol-gel processes, controlled seed and growth processes, MOCVD processes and emulsion processes. These processes are described in detail in the literature.

The particles are compressed to give a body, preferably at a force of at least 500 kN, especially more than 700 kN, preferably more than 800 kN, preferably not more than 1500 kN, especially 1200 kN. Particular preference is given to a force of 500 kN to 1500 kN, especially from 800 kN to 1200 kN, more preferably 900 kN to 1100 kN.

This can be accomplished by uniaxial pressing. Preference is given to isostatic pressing, particular preference to cold isostatic pressing. For this purpose, the particles may be filled into corresponding molds. Preferably, no further auxiliaries are added.

The pressing time may be 2 seconds to 1 hour. Preference is given to pressing at room temperature.

Thereafter, the pressed body is subjected to a thermal treatment in an oxygenous atmosphere. The temperature here is at least 200° C., preferably at least 400° C. Preference is given to a temperature of 200° C. to 900° C., preferably 400° C. to 800° C., more preferably 500° C. to 800° C. Particularly good results were obtained in a treatment at 500° C. to 750° C.

The thermal treatment is conducted until the organic constituents have been removed to a sufficient degree. There may be discoloration of the body from blue to white as a result of the oxidation of the inorganic constituents. Depending on the body, the treatment may last for between 1 minute and 25 hours, preferably 30 minutes to 2 hours, this being the period within which the desired temperature is maintained. The body is preferably heated to the target temperature within up to 4 hours. Thereafter, the body is preferably left to cool down to a temperature below 100° C. in the oven. This can take 10 to 48 hours.

The thermal treatment takes place in an oxygenous atmosphere. The atmosphere should therefore have a sufficient proportion of oxygen. Preference is given to a proportion of at least 5% by volume, preferably of at least 20% by volume. The further constituents preferably include gases that are unreactive under the conditions, such as nitrogen or argon. It is also possible for up to 0.1% by volume of further gaseous constituents to be present.

The thermal treatment can also be conducted simply under air.

After the first thermal treatment, the body is subjected to a further thermal treatment under a reducing atmosphere. The temperature here is at least 200° C., preferably at least 400° C. Preference is given to a temperature of 200° C. to 900° C., preferably 400° C. to 800° C., more preferably 500° C. to 800° C. Particularly good results were obtained in a treatment at 500° C. to 750° C. Depending on the body, the treatment can last for between 1 minute and 25 hours, preference being given to 30 minutes to 2 hours, this being the period in which the desired temperature is maintained. The body is preferably heated to the target temperature within up to 4 hours. Thereafter, the body is preferably left to cool down in the oven to a temperature below 100° C. This can take 10 to 48 hours.

Preference is given to choosing the conditions such that no reduction of the $TiO_2$ takes place, i.e. no formation of lower titanium dioxides, titanium suboxides or Magneli phases.

The proportion of reducing gas in the gas mixture is in the range from 0.05% to 10% by volume, based on the total volume of the gas mixture. The proportion of reducing gas can be adjusted to the temperature chosen. The higher the reaction temperature chosen, the lower the proportion of reducing gas in the gas mixture has to be for there to be no formation of titanium suboxides. At relatively low reaction temperature within the aforementioned range, by contrast, it is possible to choose a higher content of reducing gas in the gas mixture.

In this way, the proportion of reducing gas in the gas mixture at a reaction temperature of 550° C. may be 3% to 10% by volume.

The x-ray diffractogram of the body includes solely the respective anatase and/or rutile crystal modification, preferably anatase only. The x-ray diffractogram may have a slight shift as a result of the Nb content.

Reducing gases used may be hydrogen, ammonia or hydrocarbon compounds having 1 to 4 carbon atoms ($C_1$-$C_4$). Useful carrier gases especially include nitrogen or argon, which constitute the further constituents of the gas mixture. Particular preference is given to using forming gas ($N_2/H_2$) with the abovementioned small proportion of hydrogen. This avoids additional doping by carbon or nitrogen.

In a preferred embodiment of the invention, both thermal treatments are conducted at temperatures above 400° C., preferably at 500° C. to 800° C., especially at 500 to 750° C.

It has been found that the process of the invention can distinctly improve conductivity. The thermal treatment in an oxygenous atmosphere can remove organic constituents of the particles. This does also reduce the conductivity of the particles. However, this step ensures that the percolation of the particles within the body is improved since their surfaces are no longer covered by organic groups. The porosity of the body is also improved. However, this oxidizes $Ti^{3+}$, which is responsible for the blue color. It is only the treatment in reducing atmosphere that distinctly improves conductivity.

The particles doped in accordance with the invention are preferably produced by a sol-gel process to form the nanoparticles. In the sol-gel process, hydrolyzable compounds are normally hydrolyzed with water, optionally under acidic or basic catalysis, and optionally at least partly condensed. The hydrolysis and/or condensation reactions lead to formation of compounds or condensates having hydroxy groups, oxo groups and/or oxo bridges that serve as precursors. By suitable adjustment of the parameters, for example degree of condensation, solvent, temperature, water concentration, duration or pH, it is possible to obtain the sol containing the particles of the invention.

The hydrolysis and condensation reaction here is preferably conducted in such a way that the hydrolyzable compounds are not fully hydrolyzed and nanoparticles are formed, meaning that the nanoparticles formed still have hydrolyzable groups on their surface. The person skilled in the art faced with the task of not fully hydrolyzing the hydrolyzable compounds is aware of how this is achieved by suitable adjustment of the abovementioned parameters. There follows an elucidation of some preferred conditions. This process affords particles that are redispersible in a simple manner by virtue of the unhydrolyzed groups on their surface. The group can also be controlled in a simple manner via the choice of compounds and solvents used.

The hydrolysis and condensation can be conducted in a solvent, but they can also be conducted without solvent, in which case the hydrolysis can form solvents or other liquid constituents, for example in the case of hydrolysis of alkoxides. The removal of the solvent may include the removal of liquid constituents present. The solvent can be removed, for example, by filtering, centrifugation and/or drying, for example evaporation.

Preference is given to conducting the hydrolysis in a solvent. The solvent used is an organic solvent in which the hydrolyzable titanium compound and the preferably likewise hydrolyzable niobium compound are preferably soluble. The solvent is also preferably miscible with water. Examples of suitable organic solvents include alcohols, ketones, ethers, amides and mixtures thereof. Preference is given to using alcohols, preferably lower aliphatic alcohols ($C_1$-$C_6$ alcohols), such as ethanol, 1-propanol, i-propanol, sec-butanol, tert-butanol, isobutyl alcohol, n-butanol and the pentanol isomers, especially 1-pentanol, preference being given to methanol and ethanol, especially ethanol. Preference is given to using an alcohol having the same hydrocarbon chain as the alkoxides used with preference.

The hydrolysis is preferably effected with a substoichiometric amount of water, meaning that the molar ratio of water to hydrolyzable groups in the hydrolyzable compounds is less than 1, preferably not more than 0.8, more preferably not more than 0.6 and even more preferably not more than 0.5, especially less than 0.5. The molar ratio is preferably greater than 0.05 and more preferably greater than 0.1. A preferred molar ratio is, for example, 0.1 to 0.5.

As mentioned, the hydrolysis can be acid- or base-catalyzed, preference being given to acid catalysis. It is possible to use inorganic or organic acids. Particular preference is given to inorganic acids; in the case of organic acids such as acetic acid, the reaction can be incomplete. In the case of use of nitric acid or sulfuric acid, there may be additional doping with nitrogen or sulfur atoms. Particular preference is given to hydrochloric acid (HCl), especially having a concentration of at least 2 molar, preferably at least 10 molar, especially concentrated hydrochloric acid. Concentrated hydrochloric acid is a solution with at least 10 mol/l, especially at least 12 mol/l. Preferably, the acid, which is an aqueous solution of HCl in the case of hydrochloric acid, is the only addition of water for production of the particles.

The hydrolysis can be conducted at room temperature (about 23° C.), but is preferably effected with heating, for example to at least 60° C., preferably at least 100° C. or at least 200° C. In a particularly preferred embodiment, the hydrolysis is effected with heating and under pressure (hydrothermal reaction), more preferably by heating in a closed vessel (autogenous pressure).

In a preferred embodiment of the invention, the hydrolysis is conducted in a closed vessel under autogenous pressure and at a temperature of 200 to 300° C., preferably 220 to 260° C.

The hydrolysis is conducted until particles of the invention are obtained. Preference is given to a duration of 30 minutes to 48 hours, preferably 12 hours to 36 hours, especially 20 to 36 hours.

Suitable reaction conditions naturally depend on the starting compounds used, such that, for example, according to the stability of the starting compound, a wide range of suitable conditions may be appropriate. The person skilled in the art is immediately able to select suitable conditions depending on the compounds chosen.

Hydrolyzable compounds or precursors employed may be alkoxides, but also other compounds capable of hydrolysis, for example precursors containing acyl groups or complex-formed precursors, for example β-diketone complexes. It is also possible to employ organyls having metal-carbon compounds.

The hydrolyzable compound is preferably a titanium compound of the general formula $MX_n$ (I) in which M above is Ti and X is a hydrolyzable group that may be the same or different, where two X groups may be replaced by a bidentate hydrolyzable group or an oxo group, or three X groups may be replaced by a tridentate hydrolyzable group, and n corresponds to the valency of the element M and is 4 in the case of Ti. When M is Nb, n is generally 5.

Preferably, the X group is a group of low mass. This ensures that the surface of the particles is not covered with groups that are difficult to remove. Examples of preferred groups include halogen (F, Cl, Br or I, especially Cl and Br), alkoxy (preferably $C_{1-6}$-alkoxy, especially $C_{1-4}$-alkoxy, for example methoxy, ethoxy, n-propoxy, i-propoxy, butoxy, i-butoxy, sec-butoxy and tert-butoxy), aryloxy (preferably $C_{6-10}$-aryloxy, for example phenoxy), acyloxy (preferably $C_{1-6}$-acyloxy, for example acetoxy or propionyloxy) or alkylcarbonyl (preferably $C_{2-7}$-alkylcarbonyl, for example acetyl). Preference is given to small groups having up to 3 carbon atoms, for example $C_{1-3}$-alkoxy, for example ethoxy, n-propoxy, i-propoxy, $C_{1-3}$-acyloxy, for example acetoxy or propionyloxy, $C_1$-$C_3$-alkenyloxy, such as vinyl or allyloxy, $C_1$-$C_3$-alkynyloxy or $C_{2-3}$-alkylcarbonyl, for example acetyl. These can be removed better, which improves conductivity.

The hydrolyzable metal or semimetal compounds, for example those of the above formula (I), may also have complexing radicals, for example β-diketone and (meth) acryloyl radicals. Examples of suitable complexing agents are unsaturated carboxylic acids and β-dicarbonyl compounds, for example methacrylic acid, acetylacetone and ethyl acetoacetate.

In a preferred embodiment, the Nb compound added for doping is also a compound of the formula (I) where M is then Nb. As a result, it can be better incorporated into the particles.

Examples of compounds are $Ti(OCH_3)_4$, $Ti(OC_2H_5)_4$, $Ti(O\text{-}n\text{-}C_3H_7)_4$, $Ti(O\text{-}i\text{-}C_3H_4)_4$, $TiCl_4$, $NbCl_5$, $Nb(OCH_3)_5$, $Nb(OC_2H_5)_5$, $Nb(O\text{-}n\text{-}C_3H_7)_5$, $Nb(O\text{-}i\text{-}C_3H_7)_5$, $Nb(O\text{-}i\text{-}C_3H_7)_4$thd (thd=2,2,6,6-tetramethylheptane-3,5-dionate).

Preferably, all compounds of the formula (I) used are alkoxides or complexes comprising alkoxides. They preferably comprise solely groups composed of carbon, hydrogen and oxygen. Examples of preferred compounds are: $Ti(OCH_3)_4$, $Ti(OC_2H_5)_4$, $Nb(OCH_3)_5$ and $Nb(OC_2H_5)_5$. As a result, the input of chloride ions via the reactants is as small as possible. Alkoxides are chemically more similar and, specifically when an alcohol is also used as solvent, allow the production of particularly homogeneous particles.

The composition preferably does not include any further metal compounds.

Preferably, the Ti and Nb compounds are used according to the desired degree of doping.

Preferably, crystalline particles including anatase or rutile, preferably anatase modification, are obtained. The content of Nb can widen the lattice slightly.

After hydrolysis, the particles obtained are isolated by removing the solvent and obtained as powder.

The bodies produced can be contacted with electrodes. This can be accomplished, for example, by the sputtering application of metallic layers.

The body produced has a specific resistivity below 10 Ωcm, preferably below 1 Ωcm.

The invention also relates to bodies produced by the process of the invention.

The invention also relates to a process for producing Nb-doped $TiO_2$ nanoparticles in a preferred embodiment of the process described above.

What is used here is a mixture comprising at least one hydrolyzable titanium compound, preferably of the formula (I), and at least one hydrolyzable niobium compound, preferably of the formula (I), in an organic solvent and water in a substoichiometric amount, based on all the hydrolyzable groups present. This mixture is treated under autogenous pressure at 200 to 300° C. to form Nb-doped $TiO_2$ nanoparticles. The treatment can be conducted for 12 to 36 hours. By removing the solvent, it is possible to obtain a powder of Nb-doped $TiO_2$ nanoparticles. The particles obtained are crystalline and have an anatase structure.

In a preferred embodiment, the hydrolyzable compounds are alkoxide compounds having 1 to 3 carbon atoms.

Further details and features are apparent from the description below of preferred working examples in association with the dependent claims. It is possible here for the respective features to be implemented on their own or for several to be implemented in combination. The means of achieving the object are not limited to the working examples. For example, stated ranges always include all unspecified intermediate values and all conceivable part-intervals.

BRIEF DESCRIPTION OF THE DRAWINGS

The working examples are shown in schematic form in the figures. Identical reference numerals in the individual figures denote elements that are the same or have the same function or correspond to one another in terms of their functions. The figures specifically show.

C. for 1 h in each case. The bandgap shifts after the treatment from 3.23 eV to 3.15 eV.

DETAILED DESCRIPTION OF THE DRAWINGS

Figure 1:
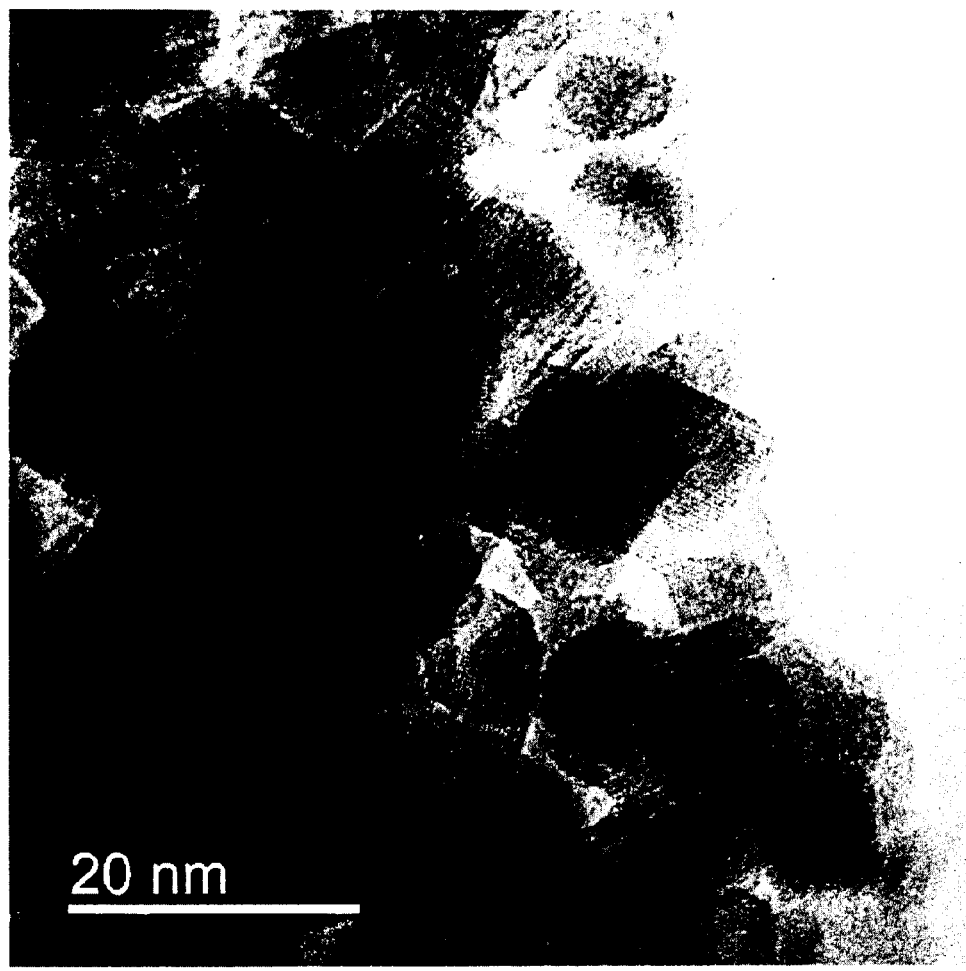
FIG. 1 TEM image of TNO5 nanoparticles. The particles are crystalline, as apparent from the visible lattice planes. They have an average size of 12 nm and, owing to their tetragonal crystal system, frequently have an angular form in TEM images.

The precursors $Ti(OEt)_4$ (for 5 at % Nb: 70.0 g, 306.8 mmol) and $Nb(OEt)_5$ (5.14 g, 16.1 mmol) were weighed out together in a glovebox and then mixed rapidly with abs. ethanol (480 ml) outside the glovebox. This mixture was left to stir overnight (about 18 h). Thereafter, concentrated hydrochloric acid (6.45 g) was added rapidly while stirring. After stirring for a further 3 h, the reaction solution was divided homogeneously between four 200 ml Teflon vessels (about 130 ml each). These were screwed into steel vessels in a fixed manner and heated to 240° C. in heating blocks for 25 h. After complete cooling, the clear supernatant was removed and the blue solids were introduced together with water into 500 ml centrifuge vessels. After adding a few drops of NaOH to neutralize the HCl, the samples were washed at least three times with water until the wash water reached a conductivity of less than 20 µS/cm. The solids were then transferred to a flask with a minimum amount of water, frozen in liquid nitrogen and freeze-dried.

The powders are treated with TNOx where x denotes the at % of niobium (x=n(Nb)/n(Nb)+n(Ti)*100). For production of the other dopings, the ratio of Nb and Ti was always chosen such that the molar amounts of the two precursors add up to about the same, i.e. around 322 mmol per batch. All other amounts remained the same.

All powders were characterized by XRD, Raman, BET, TEM and UV-Vis measurements. The specific surface areas SSA were used, by the following formula (1), assuming that the particles are spherical, to calculate the particle size $d_p$:

$$d_p = 6000/(\rho * SSA) \quad (1)$$

Figure 4:
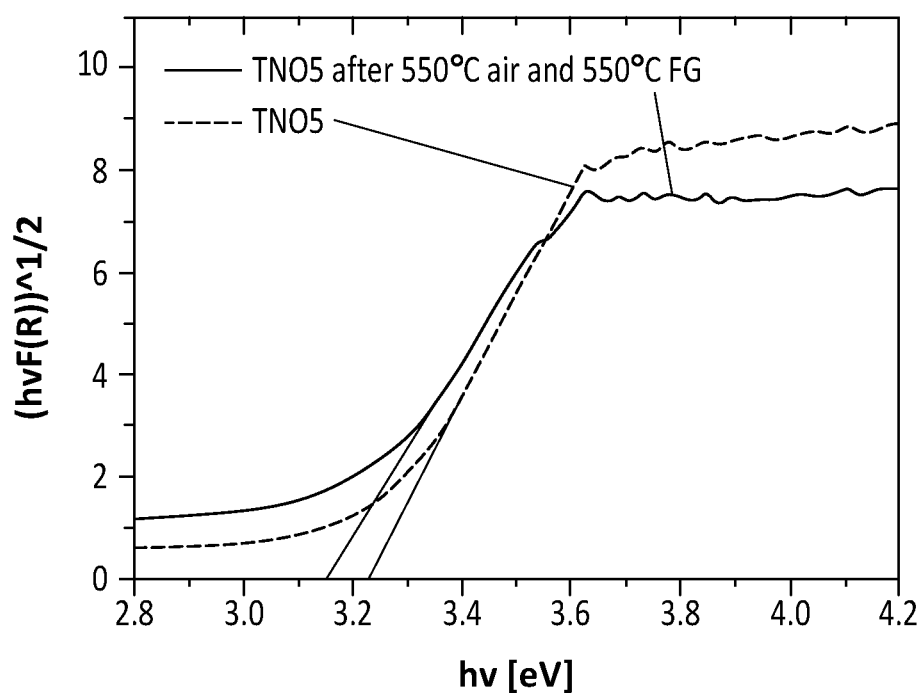
FIG. 4 change in the bandgap of a TNO5 sample by treatment under air at 550° C. and under forming gas at 550°
Figure 7:
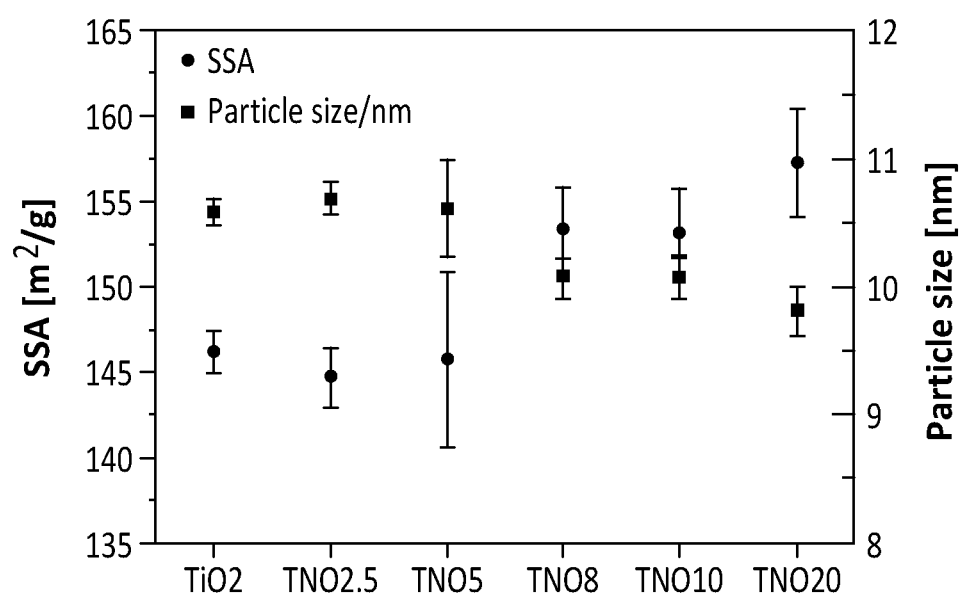
FIG. 7 specific surface area SSA and particle size as a function of the Nb content determined by BET measurements. The particles thereafter have an average size between 9 and 11 nm, falling slightly with rising Nb content.

This formula can be derived from the particle volume of a spherical particle and its density $\rho$. Since the particle shape is only approximately spherical and the density of undoped anatase was used as a simplification, this formula can give only an estimate for the particle size (FIG. 7). The particle shape and size were therefore confirmed by TEM images. The UV-Vis reflection measurements were used to determine the bandgap of the materials with the aid of the Kubelka-Munk method and the Tauc plot. For this purpose, $(\alpha h\upsilon)^{1/r}$ is plotted against $h\upsilon$. The point of intersection of the extrapolated linear slope of the curve with x=0 then gives the bandgap (table 1; FIG. 4).

FIG. 1 shows a TEM image of TNO5 nanoparticles. The narrow size distribution of the particles is readily apparent.

Figure 2:
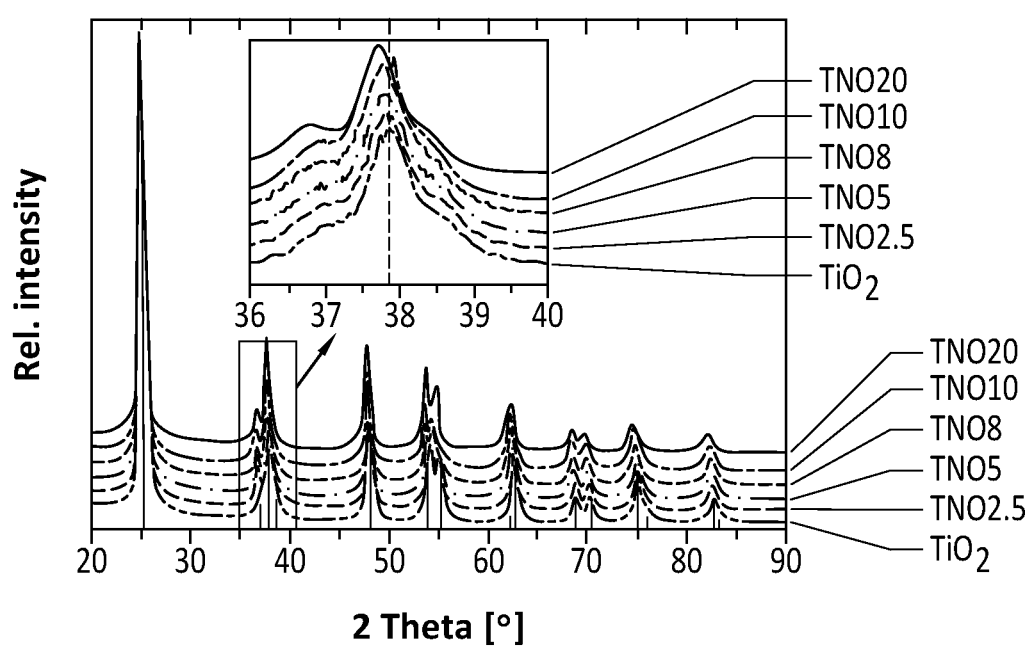
FIG. 2 XRD of the nanoparticle powders produced. From undoped $TiO_2$ as reference up to 20 at % Nb, anatase is conserved as modification. The sequence of measurements from the top downward: TNO20, TNO10, TNO8, TNO5, TNO5.2, $TiO_2$)
Figure 3:
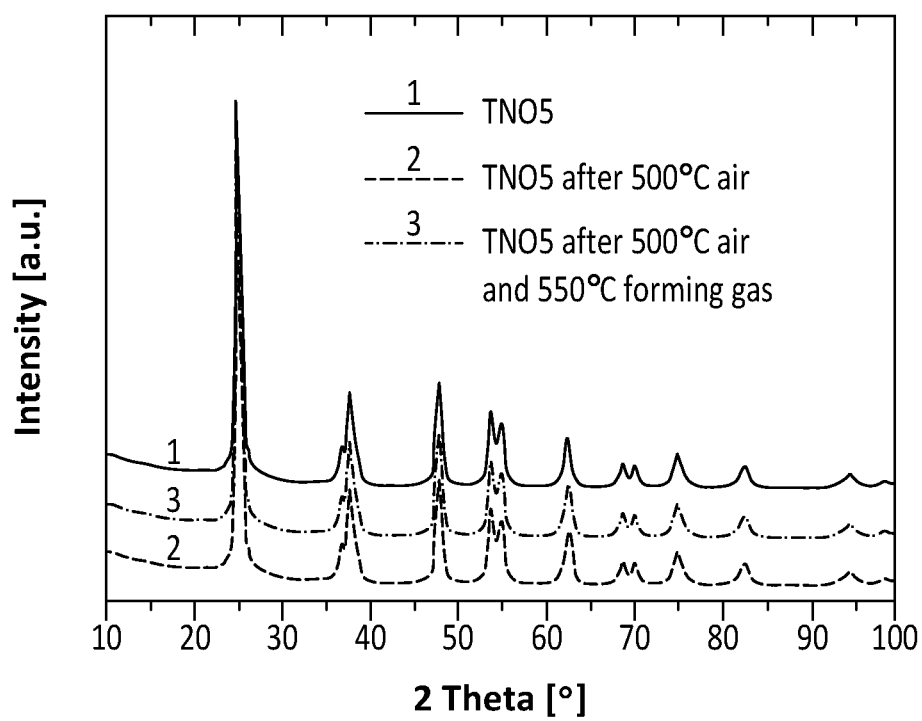
FIG. 3 XRD of a TNO5 powder as obtained after synthesis, and after 1 h at 500° C. under air and subsequently 1 h at 550° C. under forming gas. All measurements show that purely anatase is present as modification. Even through heating to more than 500° C., the modification is conserved. The sequence of measurements from the top downward is TNO5, TNO5 after 500° C. air and 550° C. forming gas; TNO5 after 500° C. air.

FIGS. 2 and 3 show XRD measurements of various particles. It is found that the reflections are slightly shifted toward smaller angles. Nevertheless, all samples show an anatase structure. The sequence of lines in the measurement from the top downward corresponds to the sequence in the legend (TNO8, TNO5, TNO2.5 and $TiO_2$).

Producing the Pellets

Materials used for the production of pellets were the TNO powders produced with different Nb contents from 0 to 20 at % Nb. Also used as a reference was a commercial ITO nanoparticle powder. The pellets were produced with the aid of a cold isostatic press at 1000 kN and pressing time 30 s in flexible silicone molds having an internal diameter of 1 cm and a height of 0.5 cm. 0.4 g of powder was used each time. In order to remove residues of the silicone mold on the surface of the pellets, the pellets were then polished with SiC abrasive paper.

Figure 5:
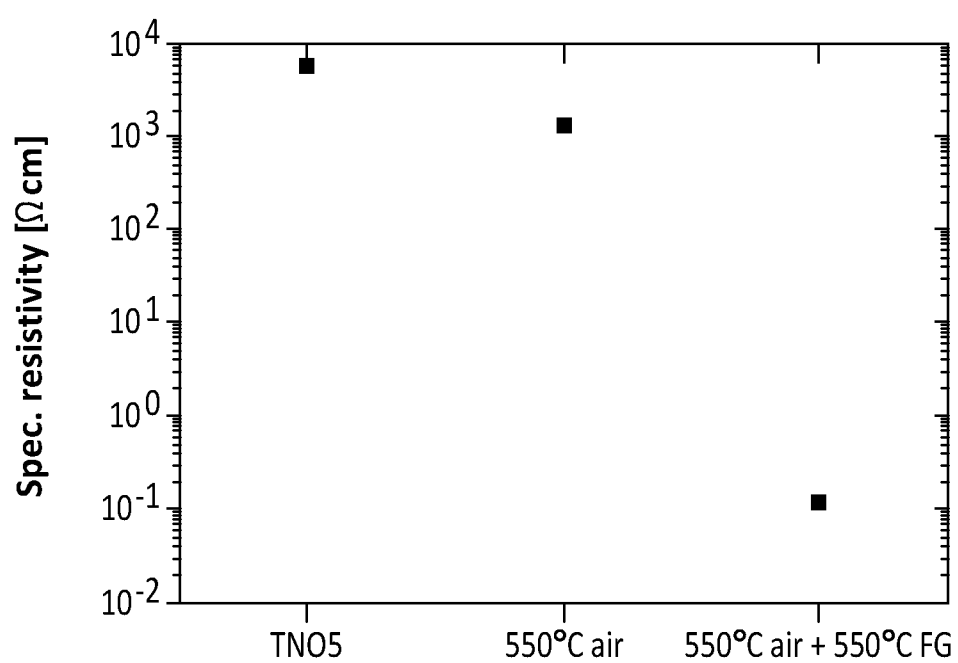
FIG. 5 specific resistivities of TNO5 pellets by sintering under air and forming gas at 550° C. for 1 h in each case. The sintering under air firstly burns the organics, and the material changes color from blue to white. Sintering under forming gas reduces the material again and brings it back to its original blue state. This lowers resistivity by 4 orders of magnitude.
Figure 6:
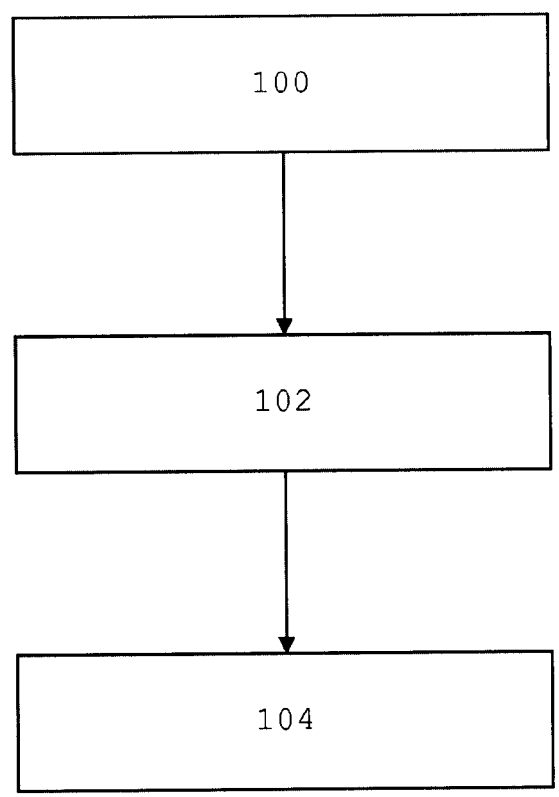
FIG. 6 schematic diagram of the process of the invention.

For measurement of resistivity, multiple methods of contacting the pellets were tested. The best contacting was achieved with electrodes applied by sputtering (e.g. Ag, 100 W, sputtered on both sides for 10 min). The resistances were determined with a 2-point multimeter up to the GOhm range. The thickness h and the diameter d of the pellets were used to determine a specific resistivity $\rho$ therefrom, which, in the case of a bulk body, should be a temperature-dependent material constant. Of course, it is necessary to take account of the fact that the pellets have a certain porosity. To improve conductivity, the pellets were sintered at various temperatures (550 to 750° C.) under air and then at 550° C. in forming gas ($N_2/H_2$, 95:5). The heating under air was supposed to serve to increase the crystallinity and the burning of organic residues on the surface. For each doping, three pellets were produced from different synthesis batches. These were used to calculate the average and standard deviation in each case. The blue pellets (prior to thermal treatment) have the highest resistivity of the TNO pellets. There is a slight fall in resistance with increasing Nb content. However, aftertreatment of the pellets under air and forming gas reduces the resistivity by several orders of magnitude. The smallest resistivity that was achieved is only a factor of 40 away from the value for a comparable ITO pellet. The results of the resistivity measurement are shown in FIG. 5. The results show that TNO treated in accordance with the invention is a possible alternative to ITO.

TABLE 1

| Material | Bandgap |
| --- | --- |
| $TiO_2$ | 3.24 |
| TNO2.5 | 3.22 |
| TNO5 | 3.23 |
| TNO8 | 3.21 |
| TNO10 | 3.17 |
| TNO20 | 3.12 |

LITERATURE CITED

Liu et al., ACS Nano 4, 9 (2010) 5373-5381.
Nemec et al., J. Phys. Chem. C, 115 (2011) 6968-6974.

The invention claimed is:

1. A process for producing conductive bodies, comprising:
   producing Nb-doped $TiO_2$ particles by hydrolysis of at least one hydrolyzable titanium compound and at least one hydrolyzable niobium compound in an organic solvent and a substoichiometric amount of water and an inorganic acid catalyst;
   compressing the Nb-doped $TiO_2$ particles to give a body;
   subjecting the body to heat treatment at a temperature of 400 to 800° C. in an oxygenous atmosphere; and
   subjecting the body to heat treatment at a temperature of 400 to 800° C. in a reducing atmosphere.

2. The process as claimed in claim 1, wherein the particles have a particle size below 200 nm.

3. The process as claimed in claim 1, wherein the particles have an Nb content of up to 30 at %.

4. The process as claimed in claim 1, wherein the compressing is effected at a pressure of at least 500 kN.

5. The process as claimed in claim 1, wherein the thermal treatment in the oxygenous atmosphere is effected at a temperature of 500 to 800° C.

6. The process as claimed in claim 1, wherein the thermal treatment in the reducing atmosphere is effected at a temperature of 500 to 800° C.

7. The process as claimed in claim 1, wherein both heat treatments are conducted at temperatures of 500 to 800° C.

8. The process as claimed in claim 1, wherein the reducing atmosphere has a proportion of reducing gas of 0.05% to 10% by volume.

9. The process as claimed in claim 1, wherein the particles are produced by a sol-gel process.

10. A conductive body produced by the process as claimed in claim 1.

11. A process for producing Nb-doped titanium dioxide nanoparticles, comprising:
preparing a mixture comprising at least one hydrolyzable titanium compound and at least one hydrolyzable niobium compound in an organic solvent and water in a substoichiometric amount, based on all the hydrolyzable groups present, and an inorganic acid; and
treating the mixture at 200° C. to 300° C. under autogenous pressure to form Nb-doped titanium dioxide nanoparticles.

12. The process as claimed in claim 1, wherein said compressing comprises placing the Nb-doped $TiO_2$ particles into a mold.

13. The process as claimed in claim 11, wherein a molar ratio of water to hydrolyzable groups in the hydrolyzable compounds is not more than 0.8.

14. The process as claimed in claim 11, wherein a molar ratio of water to hydrolyzable groups in the hydrolyzable compounds is more than 0.05.

15. The process as claimed in claim 11, wherein the inorganic acid comprises hydrochloric acid.

* * * * *